United States Patent
Fukushima et al.

(10) Patent No.: US 11,713,430 B2
(45) Date of Patent: Aug. 1, 2023

(54) GREASE COMPOSITION, MACHINE COMPONENT, AND STARTER OVERRUNNING CLUTCH

(71) Applicants: Denso Corporation, Kariya (JP); Dow Corning Toray Co., Ltd., Tokyo (JP)

(72) Inventors: Yoshinori Fukushima, Kariya (JP); Youichi Hasegawa, Kariya (JP); Yuji Masamura, Hadano (JP); Makoto Mori, Kariya (JP); Koji Sakakibara, Kariya (JP)

(73) Assignees: DENSO CORPORATION, Kariya (JP); DUPONT TORAY SPECIALTY MATERIALS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/794,507

(22) Filed: Feb. 19, 2020

(65) Prior Publication Data

US 2020/0181521 A1   Jun. 11, 2020

Related U.S. Application Data

(63) Continuation of application No. 16/082,707, filed as application No. PCT/JP2017/001943 on Jan. 20, 2017, now abandoned.

(30) Foreign Application Priority Data

Mar. 11, 2016   (JP) ................. 2016-047995

(51) Int. Cl.
| | |
|---|---|
| *C10M 107/50* | (2006.01) |
| *C10M 135/18* | (2006.01) |
| *C10M 169/06* | (2006.01) |
| *F16C 33/66* | (2006.01) |
| *C10M 169/04* | (2006.01) |
| *C10M 117/02* | (2006.01) |
| *C10N 10/02* | (2006.01) |
| *C10N 10/04* | (2006.01) |
| *C10N 30/06* | (2006.01) |
| *C10N 40/04* | (2006.01) |
| *C10N 50/10* | (2006.01) |

(52) U.S. Cl.
CPC ........ *C10M 107/50* (2013.01); *C10M 117/02* (2013.01); *C10M 135/18* (2013.01); *C10M 169/04* (2013.01); *C10M 169/06* (2013.01); *F16C 33/66* (2013.01); *C10M 2207/1265* (2013.01); *C10M 2219/068* (2013.01); *C10M 2223/042* (2013.01); *C10M 2229/025* (2013.01); *C10M 2229/0425* (2013.01); *C10N 2010/02* (2013.01); *C10N 2010/04* (2013.01); *C10N 2030/06* (2013.01); *C10N 2040/04* (2013.01); *C10N 2050/10* (2013.01)

(58) Field of Classification Search
CPC .... C10M 2207/1265; C10M 2223/042; C10M 2219/068; C10M 107/50; C10M 2229/0425; C10M 2229/025; C10M 169/06; C10M 169/04; C10M 117/02; C10M 135/18; C10N 2010/02; C10N 2010/04; C10N 2030/06; C10N 2040/04; C10N 2050/10; F16C 33/66

See application file for complete search history.

(56) References Cited

U.S. PATENT DOCUMENTS

| | | | | |
|---|---|---|---|---|
| 3,145,175 | A * | 8/1964 | Wright | ................ C10M 7/00 508/136 |
| 4,728,450 | A * | 3/1988 | Toya | ................ C10M 107/50 508/208 |
| 4,842,753 | A | 6/1989 | Mori et al. | |
| 5,318,160 | A | 6/1994 | Oomi et al. | |
| 5,512,188 | A * | 4/1996 | Kinoshita | ............ C10M 135/18 508/137 |
| 5,908,815 | A | 6/1999 | Shen | |
| 6,022,835 | A | 2/2000 | Fletcher | |
| 6,191,080 | B1 | 2/2001 | Nakanishi et al. | |
| 6,352,961 | B1 * | 3/2002 | Iso | ................ F16C 33/6633 508/155 |
| 2005/0003970 | A1 * | 1/2005 | Ohmura | ............... C10M 169/06 508/365 |
| 2007/0173420 | A1 | 7/2007 | Iso | |

(Continued)

FOREIGN PATENT DOCUMENTS

| | | |
|---|---|---|
| CN | 1052891 A | 7/1991 |
| CN | 1253168 A | 5/2000 |

(Continued)

OTHER PUBLICATIONS

International Search Report with translation for PCT/JP2017/001943 dated Mar. 14, 2017, 5 pages.

English language abstract and machine assisted translation for JPH034036 (A) extracted from j-platpat.inpit.go.jp database on Jun. 4, 2018 and worldwide.espacenet.com database, 7 pages.

(Continued)

*Primary Examiner* — James C Goloboy
(74) *Attorney, Agent, or Firm* — Warner Norcross + Judd LLP

(57) ABSTRACT

A silicone grease composition is disclosed. The grease composition contains a silicone oil and zinc dialkyldithiocarbamate as an extreme-pressure additive. The grease composition contains substantially no zinc dialkyldithiophosphate. The grease composition achieves high friction characteristics and wear characteristics. A method for transmitting torque of a clutch or a torque limiter mechanism is also disclosed. Moreover, a method for producing a clutch or a torque limiter mechanism is disclosed. The methods utilize the aforementioned grease composition.

18 Claims, No Drawings

(56) References Cited

U.S. PATENT DOCUMENTS

| | | | |
|---|---|---|---|
| 2008/0026963 A1* | 1/2008 | Sakamoto | C10M 107/34 508/218 |
| 2008/0161214 A1 | 7/2008 | Asakura et al. | |
| 2008/0196995 A1* | 8/2008 | Mikami | F16D 41/06 384/607 |
| 2008/0271967 A1* | 11/2008 | Nakatani | F16C 33/6633 192/45.006 |
| 2009/0124400 A1* | 5/2009 | Mikami | F16C 33/6633 184/5 |
| 2009/0247435 A1* | 10/2009 | E | C10M 159/18 508/370 |
| 2010/0173807 A1 | 7/2010 | Nagumo et al. | |
| 2011/0059875 A1 | 3/2011 | Tanimura et al. | |
| 2011/0160105 A1* | 6/2011 | Tanaka | C10M 129/44 508/144 |
| 2011/0183876 A1* | 7/2011 | Imai | C10M 169/06 508/100 |
| 2015/0232784 A1* | 8/2015 | Aida | C10M 169/00 508/364 |
| 2015/0252283 A1 | 9/2015 | Sekiguchi et al. | |
| 2017/0002285 A1* | 1/2017 | Hirooka | C10M 169/02 |
| 2019/0085257 A1 | 3/2019 | Fukushima et al. | |
| 2019/0085260 A1 | 3/2019 | Fukushima et al. | |

FOREIGN PATENT DOCUMENTS

| | | | | |
|---|---|---|---|---|
| CN | 1922295 | A | | 2/2007 |
| CN | 101679904 | A | | 3/2010 |
| CN | 104769087 | A | | 7/2015 |
| CN | 106029851 | A | | 10/2016 |
| EP | 0508115 | A1 | | 10/1992 |
| EP | 1510569 | A1 | | 3/2005 |
| EP | 1911994 | A1 | | 4/2008 |
| JP | S63275696 | A | | 11/1988 |
| JP | H034036 | A | | 1/1991 |
| JP | 04279698 | A | | 10/1992 |
| JP | 05132689 | A | * | 5/1993 |
| JP | H05132689 | A | | 5/1993 |
| JP | H05171171 | A | | 7/1993 |
| JP | H05171171 | A | | 7/1993 |
| JP | H05230486 | A | | 9/1993 |
| JP | H06279777 | A | | 10/1994 |
| JP | H08143883 | A | | 6/1996 |
| JP | H08143883 | A | | 6/1996 |
| JP | H093473 | | | 1/1997 |
| JP | H093473 | A | | 1/1997 |
| JP | S63275696 | A | | 11/1998 |
| JP | H1161168 | A | | 3/1999 |
| JP | 2004323586 | A | | 11/2004 |
| JP | 2006077967 | A | | 3/2006 |
| JP | 2006182909 | A | | 7/2006 |
| JP | 2006182909 | A | | 7/2006 |
| JP | WO2006109541 | A1 | | 10/2006 |
| JP | 2007255478 | A | | 10/2007 |
| JP | 2008308587 | A | | 12/2008 |
| JP | 2010112235 | A | | 5/2010 |
| JP | 2015151516 | A | | 8/2015 |
| JP | 2015151516 | A | * | 8/2015 ......... C10M 107/50 |
| JP | 2015151516 | A | | 8/2015 |
| WO | 2006109541 | A1 | | 10/2006 |
| WO | 2006132349 | A1 | | 12/2006 |
| WO | WO2006132349 | A1 | | 12/2006 |
| WO | 2011142411 | A1 | | 11/2011 |

OTHER PUBLICATIONS

English language abstract and machine assisted translation for JPH05132689 (A) extracted from j-platpat.inpit.go.jp database on Jun. 4, 2018 and worldwide.espacenet.com database, 7 pages.

English language abstract and machine assisted translation for JPH05230486 (A) extracted from j-platpat.inpit.go.jp database on Jun. 4, 2018, 6 pages.

English language abstract and machine assisted translation for JPH08143883 (A) extracted from j-platpat.inpit.go.jp database on Jun. 4, 2018, 14 pages.

English language abstract and machine assisted translation for JPH093473 (A) extracted from j-platpat.inpit.go.jp database on Jun. 4, 2018, 10 pages.

English language abstract and machine assisted translation for JP2004323586 (A) extracted from j-platpat.inpit.go.jp database on Jun. 4, 2018, 10 pages.

English language abstract and machine assisted translation for JP2010112235 (A) extracted from j-platpat.inpit.go.jp database on Jun. 4, 2018, 10 pages.

Machine assisted English translation of JPH06279777A obtained from https://patents.google.com on Nov. 18, 2019, 8 pages.

Machine assisted English translation of JPH1161168A obtained from https://patents.google.com on Nov. 18, 2019, 10 pages.

Machine assisted English translation of JP2007255478A obtained from https://patents.google.com on Nov. 18, 2019, 6 pages.

Machine assisted English translation of JP2008308587A obtained from https://patents.google.com on Nov. 18, 2019, 7 pages.

Machine assisted English translation of WO2011142411A1 obtained from https://patents.google.com on Nov. 18, 2019, 10 pages.

Machine assisted English translation of JP2006077967A obtained from https://patents.google.com on Nov. 19, 2019, 8 pages.

English translation of International Search Report for PCT/JP2017/001927 dated Apr. 4, 2017, 3 pages.

Office Action and Search Report for CN Appl. No. 201780015596.4 dated Mar. 10, 2021.

Machine assisted English Translation of CN1052891A obtained from https://worldwide.espacenet.com on May 7, 2021, 13 pages.

Machine assisted English Translation of CN1253168A obtained from https://worldwide.espacenet.com on May 7, 2021, 11 pages.

\* cited by examiner

GREASE COMPOSITION, MACHINE COMPONENT, AND STARTER OVERRUNNING CLUTCH

CROSS-REFERENCE TO RELATED APPLICATIONS

This application is a Continuation of U.S. application Ser. No. 16/082,707, filed on 6 Sep. 2018, which is the National Stage of International Application No. PCT/JP2017/001943 filed on 20 Jan. 2017, which claims priority to and all advantages of Japanese Patent Appl. No. 2016-047995 filed on 11 Mar. 2016, the content of which is hereby incorporated by reference.

TECHNICAL FIELD

The present invention relates to a grease composition containing a silicone oil. Specifically, the present invention relates to a grease composition that is suitable for use in a lubricated part of a starter overrunning clutch, that contains zinc dialkyldithiocarbamate as an extreme-pressure additive, that uses a silicone oil as a base oil, and that achieves a high coefficient of friction and excellent wear resistance. Furthermore, the present invention also relates to a machine component in which the grease composition is enclosed, and particularly relates to an overrunning clutch.

BACKGROUND ART

In general, when designing machine parts, difference in the thickness of materials therefor, i.e. weight, is determined depending on approximately what degree of safety factor of the strength should be set for the parts. Especially for automobiles, reduction in weight by use of light materials, reduction in thickness, reduction in shaft diameter, or the like is essential when emission control and effect on global environment such as global warming are taken into consideration, and it is considered that such reduction may lead to insufficient strength. Therefore, to buffer physical impact by a slip mechanism, conventionally, a clutch and/or a torque limiter mechanism are employed in various parts. Furthermore, as measures against emission of automobiles which is one cause of global warming, the start-stop system that stops an engine while the automobile is stopped at a traffic signal has been put to practical use. Therefore, the engine is started by a starter every time the automobile is restarted after being stopped at a traffic signal, hence the frequency of the engine restart is tremendously increased.

In a clutch or a torque limiter mechanism, an overrunning clutch of an engine starter of an automobile is a part where the largest torque is applied and the use condition is harsh. Depending on the use condition of the engine starter, the overrunning clutch may be exposed to an extremely low temperature of −30° C. to high temperatures of approximately 120° C. when the overrunning clutch is placed close to an exhaust pipe. In the starter overrunning clutch like this, a grease composition is used as a lubricant. Currently, grease compositions containing silicone oils as base oils have been mainly used because the coefficient of friction of a silicone oil is high and the surface tension of the silicone oil is relatively smaller, which is from 20 to 25 dyn/cm$^2$, than those of other oils. Thus, they are less likely to form a lubricating film and tend to be in the state of boundary lubrication. The number of durable operations of the overrunning clutch of the engine starter that uses commercially available silicone grease is said to be approximately from 30000 to 50000 times in today's market. However, when the start-stop system is employed, the clutch is worn out in a short period of time (some years) due to its high frequency of use, and thus it becomes impossible to transmit torque. Therefore, the motor revolves without making contact, and the engine cannot be started.

As described above, for the grease composition used in the lubricated part of the clutch and/or the torque limiter mechanism, a high coefficient of friction and excellent wear resistance are essential requirements as its characteristics. Furthermore, to withstand harsh use conditions of an overrunning clutch or the like, the grease composition is preferably capable of being used in a wide range of temperature region from extremely low temperatures to high temperatures.

In light of the circumstances described above, extreme-pressure additives have been used as additives to reduce the friction and wear between two surfaces of metals and to prevent seizure, and many kinds of grease compositions containing extreme-pressure additives have been known. For example, in JP 2010-112235 A, a lubricating oil, in which at least one of zinc dialkyldithiophosphate and zinc dialkyldithiocarbamate is added in a silicone oil, is described as a lubricating oil circulated in a screw compressor. JP 2004-323586 A describes addition of a zinc compound into a grease composition used for electrical components of automobiles and use of at least one type of zinc dialkyldithiophosphate, zinc dialkyldithiocarbamate, and zinc oxide as the zinc compound. JP 09-003473 A describes phosphate, phosphite, zinc dialkyldithiophosphate, zinc dialkyldithiocarbamate, and a sulfur compound as an antiwear additive added to a heat resistant lubricating oil composition used in automobile engines. JP 08-143883 A describes a grease composition that has high heat resistance suitable for use in fan clutch bearings for automobiles and that uses a fluorosilicone oil as a base oil, and also describes zinc dithiophosphate, zinc dithiocarbamate, phosphate, and alkyl sulfide as an extreme-pressure additive that can be added. JP 05-230486 A describes a silicone grease composition that is used for overrunning clutches of automobile starters and that contains zinc dialkyldithiophosphate.

PRIOR ART DOCUMENTS

Patent Literature

Patent Document 1: JP 2010-112235 A
Patent Document 2: JP 2004-323586 A
Patent Document 3: JP 09-003473 A
Patent Document 4: JP 08-143883 A
Patent Document 5: JP 05-230486 A

SUMMARY OF THE INVENTION

Problems to be Solved by the Invention

In recent years, as clutches and torque limiter mechanisms are made smaller and lighter and are used under harsher conditions, and especially as the frequency of use of starters for automobile engines increases, a grease composition having even higher friction characteristics and wear characteristics than those of known grease compositions has been demanded. Therefore, an object of the present invention is to provide a grease composition that has high friction characteristics and wear characteristics and that uses a silicone oil as a base oil.

Means for Solving the Problems

As a result of diligent research, the inventors of the present invention found that a grease composition containing a silicone oil (A) and zinc dialkyldithiocarbamate (B) as an extreme-pressure additive and containing substantially no zinc dialkyldithiophosphate (BX) can achieve high friction characteristics and wear characteristics, is suitable for use in power transmission devices, especially, reduces slipping in starter overrunning clutches, and can efficiently transmit torque.

That is, the present invention relates to a grease composition including: a silicone oil (A) and zinc dialkyldithiocarbamate (B), the grease composition including substantially no zinc dialkyldithiophosphate (BX). In particular, the content of the zinc dialkyldithiophosphate (BX) is preferably 0.01 mass % or less relative to the total amount of the composition.

The content of the zinc salt (B) is preferably from 5 mass % to 30 mass % relative to the total amount of the composition.

The grease composition of an embodiment of the present invention further contains at least one type of thickener (C) selected from the group consisting of lithium soap and lithium complex soap.

The content of the silicone oil (A) is preferably in a range of 50 mass % to 95 mass % relative to the total amount of the composition, and the silicone oil (A) preferably has an aromatic hydrocarbon group per molecule.

Furthermore, the present invention relates to a grease composition for power transmission devices, the grease composition including: a silicone oil (A) and zinc dialkyldithiocarbamate (B), the grease composition including substantially no zinc dialkyldithiophosphate (BX).

Furthermore, the present invention relates to a machine component in which the grease composition of an embodiment of the present invention is enclosed, and particularly relates to a clutch or a torque limiter mechanism.

In addition, the present invention relates to an overrunning clutch including the grease composition of an embodiment of the present invention in a clutch cam chamber formed by an outer clutch and an inner clutch.

Effects of the Invention

The grease composition of an embodiment of the present invention achieves high coefficient of friction and excellent enhancement of wear resistance. Furthermore, the grease composition can be used in a wide range of temperature region, from low temperatures to high temperatures. By use of a grease composition using only zinc dialkyldithiocarbamate but containing substantially no zinc dialkyldithiophosphate (BX) which is generally used, it became possible to suppress slipping of overrunning clutches which was impossible with known products, to efficiently transmit torque, and to satisfy contrary requirements, which are high friction and low wear, required for overrunning clutches.

DETAILED DESCRIPTION OF THE INVENTION

A first aspect of the present invention is a grease composition containing a silicone oil (A) and zinc dialkyldithiocarbamate (B) but containing substantially no zinc dialkyldithiophosphate (BX).

The silicone oil which is the component (A) of an embodiment of the present invention needs to be liquid at room temperature (25° C.) and may have a straight-chain or branched structure. The chemical structure thereof is not particularly limited, and examples thereof include a polyorganosiloxane (silicone oil) represented by the general formula (I) below and that is liquid at room temperature.

$$R^1_a SiO_{(4-a)/2} \quad (I)$$

In the formula, $R^1$ represents a group selected from the group consisting of monovalent hydrocarbon groups, and the $R^1$ moieties may be the same or different. a is preferably from 1.8 to 2.2, and more preferably from 1.9 to 2.1, from the perspective of ease in synthesizing a liquid silicone.

The $R^1$ moieties in Formula (1) above may be each independently an aliphatic hydrocarbon group or an aromatic hydrocarbon group. Preferably, the silicone oil used in the grease composition of an embodiment of the present invention has an aromatic hydrocarbon group as a part of the $R^1$ moieties.

The number of carbons of the hydrocarbon group of $R^1$ may be from 1 to 8. Examples of $R^1$ include alkyl groups, such as a methyl group, an ethyl group, a propyl group, and a hexyl group; cyclohexyl groups, such as a cyclopentyl group and a cyclohexyl group; alkenyl groups, such as a vinyl group and an allyl group; aryl groups, such as a phenyl group and a tolyl group; aralkyl groups, such as a 2-phenylethyl group and a 2-methyl-2-phenylethyl group; and halogenated hydrocarbon groups, such as a 3,3,3-trifluoropropyl group, a 2-(perfluorobutyl)ethyl group, a 2-(perfluorooctyl)ethyl group, and a p-chlorophenyl group. A methyl group, a vinyl group, and a phenyl group are preferable. Particularly preferably, the silicone oil contains a methyl group and a phenyl group.

Specific examples of the silicone oil include the silicones (1) to (3) described below from the perspective of general-purpose properties as a grease. In particular, (1) methyl phenyl silicone and (2) dimethyl silicone, which have high coefficients of friction, are preferably used.

(1) Methyl phenyl silicone:

$$Me_3SiO(Me_2SiO)_l(R^2R^3SiO)_m SiMe_3$$

In the formula, Me is a methyl group, $R^2$ is a methyl group or a phenyl group, $R^3$ is a phenyl group, l is 0 or a positive integer, and m is a positive integer.

Specific examples thereof include:

$$Me_3SiO(Me_2SiO)_l(MePhSiO)_m SiMe_3$$

and $$Me_3SiO(Me_2SiO)_l(Ph_2SiO)_n SiMe_3$$

(2) Dimethyl silicone:

$$Me_3SiO(Me_2SiO)_n SiMe_3$$

In the formula, Me is a methyl group, and n is a positive integer.

(3) Alkyl fluoride-modified silicone:

$$Me_3SiO(Me_2SiO)_r(MeR^4SiO)_s SiMe_3$$

In the formula, Me is a methyl group, $R^4$ is an alkyl fluoride group, r is 0 or a positive integer, and s is a positive integer.

Specifically, $$Me_3SiO(Me(CF_3CH_2CH_2)SiO)_s SiMe_3$$

Note that, in the silicones (1) to (3), the methyl group in the side chain may be a branched methyl group substituted with another siloxane group, and the terminal group may be substituted with a hydroxy group, a vinyl group, or the like.

Particularly preferable silicone oil is a methyl phenyl silicone represented by (1) above. In the methyl phenyl silicone, the content of the phenyl group is preferably in a range of 1 to 50 mol %, more preferably 3 to 25 mol %, and particularly preferably 3 to 10 mol %. This is because, when the content is less than 1 mol % relative to the total amount of the organic groups, heat resistance becomes lower and, when the content is greater than 50 mol %, the viscosity change due to temperature becomes larger, pour point becomes higher, and torque at low temperatures becomes larger.

The kinematic viscosity of the silicone oil used in an embodiment of the present invention is preferably from 20 to 1000 cSt, and more preferably from 50 to 500 cSt, at 25° C. This is because, when the kinematic viscosity is less than 20 cSt, the silicone oil is easily separated from the grease and, when the kinematic viscosity is greater than 10000 cSt, torque at low temperatures becomes larger due to viscous drag, and the grease is deteriorated due to heat build-up during high-speed rotation. The kinematic viscosity is a value measured in accordance with JIS Z 8803.

In the grease composition of an embodiment of the present invention, the content of the silicone oil may be from 10 wt. % to 99 wt. %, preferably from 30 wt. % to 97 wt. %, and more preferably from 50 wt. % to 95 wt. %, relative to the total amount of the composition.

By use of the silicone oil as described above as the base oil, it is possible to realize the grease with high friction that is required for overrunning clutches because the oil agent has a high coefficient of friction, excellent heat resistance properties, and small temperature dependence of viscosity change.

The grease composition of an embodiment of the present invention contains zinc dialkyldithiocarbamate (B) as the extreme-pressure additive. The grease composition of an embodiment of the present invention preferably, contains from 5 mass % to 30 mass % of the zinc dialkyldithiocarbamate (B). Because of the component (B), higher friction characteristics and wear characteristics of the silicone grease composition can be achieved. Only the case where the component (B) is used alone achieves such high friction characteristics and wear characteristics and effective transmission of torque while slipping of a clutch is suppressed. Furthermore, when another typical sulfur-based additive is used, such effects cannot be achieved.

The zinc dialkyldithiocarbamate of the component (B) used in an embodiment of the present invention is preferably zinc dialkyldithiocarbamate represented by the general formula (II) below.

$$[R^5{}_2N-C(=S)-S]_2-Zn \qquad (II)$$

In the formula, $R^5$ is a primary or secondary alkyl group having from 1 to 24 carbons. A primary or secondary alkyl group having from 1 to 8 carbons is particularly preferable. In particular, a methyl group, an ethyl group, and a propyl group are preferable.

In the grease composition of an embodiment of the present invention, the content of the zinc dialkyldithiocarbamate (B) may be from 1 mass % to 50 mass %, preferably from 5 mass % to 40 mass %, more preferably from 5 mass % to 30 mass %, and most preferably from 7.5 mass % to 20 mass %, relative to the total amount of the composition.

Furthermore, the second characteristic of the grease composition of an embodiment of the present invention is that the grease composition contains substantially no zinc dialkyldithiophosphate (BX). The case where the zinc dialkyldithiophosphate is not substantially contained can enhance friction characteristics and wear characteristics and can achieve a high torque transmission efficiency because slipping can be reduced, compared to the case where zinc dialkyldithiophosphate is contained.

Note that "containing substantially no" means no target compound exists at all or almost no target compound exists. That is, it means that the target compound is not intended to be contained. Therefore, it does not exclude aspects where the target compound is contained as an impurity. Specifically, in the composition of an embodiment of the present invention, the content of the zinc dialkyldithiophosphate (BX) needs to be 0.10 mass % or less, preferably 0.05 mass %, and more preferably 0.01 mass % or less, and particularly preferably, the zinc dialkyldithiophosphate (BX) is not contained to two significant figures after the decimal point (0.00 mass %), relative to the total amount of the composition from the perspective of technical effect of the present invention.

Note that, even when a trace amount of zinc dialkyldithiophosphate (BX) is contained, it is conceived that a lubricating film is formed in response to pressure and, in particular, slipping of an overrunning clutch increases and torque cannot be transmitted efficiently.

The grease composition of an embodiment of the present invention may further contain an organic or inorganic thickener. The grease composition of an embodiment of the present invention preferably contains as the component (C), a lithium soap and/or a lithium complex soap, which are organic thickeners. By allowing the lithium soap to be contained, it is possible to impart heat resistance, shear stability, and water resistance to the grease composition. Furthermore, by allowing the lithium complex soap to be contained, it is possible to impart even better shear stability and heat resistance than those imparted by the lithium soap.

The grease composition of an embodiment of the present invention may further contain an organic thickener of a urea compound or the like or an inorganic thickener of silica and bentonite or the like.

In the grease composition of an embodiment of the present invention, the content of the thickener may be from 1 mass % to 30 mass %, preferably from 2 mass % to 25 mass %, and more preferably from 2.5 mass % to 20 mass %, relative to the total amount of the composition.

The grease composition of an embodiment of the present invention preferably contains substantially no partial esters of polyhydric alcohols. The ester is used as an oil agent and is a component that adsorbs a metal at the hydroxy group moiety and prevents contact of another metal by a hydrocarbon group extended from the ester bond. However, in the present invention, slippage may be reduced at low temperatures, which is not preferable.

The grease composition of an embodiment of the present invention may further contain additives that are typically used in a grease composition. Examples of the additives include antioxidants, corrosion inhibitors, metal deactivators, detergent dispersants, extreme-pressure additives except those described above, anti-foaming agents, and demulsifiers, oiliness improvers. One type of these may be used alone, or a combination of two or more types of these may be used. The content thereof may be from 0 wt. % to 5 wt. % relative to the total amount of the composition as long as the effect of the present invention is not impaired.

The grease composition of an embodiment of the present invention is used in a lubricated part of a power transmission device. The power transmission device is a series of mechanism to transmit the output from an engine to a wheel. The power transmission device includes a clutch, a change gear, a propeller shaft, a joint, a final reduction drive, a drive wheel axle, and the like. The grease composition of an embodiment of the present invention is preferably used for a lubricated part of a clutch, and more preferably used for a lubricated part of a starter overrunning clutch.

The second aspect of the present invention is a machine component in which the grease composition of an embodiment of the present invention is enclosed, and preferably a clutch or a torque limiter mechanism. Particularly preferably, the second aspect is a starter overrunning clutch in which the grease composition of an embodiment of the present invention is enclosed. The starter overrunning clutch includes a cylindrical clutch outer and a cylindrical clutch inner arranged concentrically in the inner circumferential side of the clutch outer. A clutch roller is displaced in a circumferential direction in a clutch cam chamber formed by the clutch outer and the clutch inner. The grease composition of an embodiment of the present invention can be enclosed in the clutch cam chamber.

Another aspect of the present invention is a method of increasing the friction of a lubricated part of a power transmission device and/or reducing the wear of the lubricated part wherein the grease composition of an embodiment of the present invention is enclosed in the power transmission device. In addition, there is also a method of increasing the friction of a lubricated part of an overrunning clutch and/or reducing the wear of the lubricated part wherein the grease composition of an embodiment of the present invention is enclosed in a clutch cam chamber formed from an outer clutch and an inner clutch of the overrunning clutch.

Furthermore, another aspect of the present invention is use of the grease composition of an embodiment of the present invention to increase the friction of a lubricated part of a power transmission device and/or to reduce the wear of the lubricated part. In addition, there is also use of the grease composition of an embodiment of the present invention to increase the friction of a lubricated part of an overrunning clutch and/or to reduce the wear of the lubricated part.

INDUSTRIAL APPLICABILITY

Because the grease composition of an embodiment of the present invention has a high coefficient of friction and thus exhibits high torque transmission, and also has high wear resistance, the grease composition is suitable for use in a clutch and/or a torque limiter mechanism that are frequently used, a unidirectional clutch mechanism in which idling at high rotation is performed, and, especially, a lubricated part of a unidirectional overrunning clutch for a starter by which driving torque is transmitted to the engine and which idles so that the rotation of the engine is not transmitted to the starter motor after ignition of the engine and racing of the engine.

EXAMPLES

The present invention is specifically described below by using examples and comparative examples; however, the present invention is not limited to the examples described below.

Preparation of Grease Composition

According to the composition shown in Table 1, methyl phenyl silicone (A), either one of zinc dialkyldithiocarbamate (B) or a combination of zinc dialkyldithiocarbamate (B) and zinc dialkyldithiophosphate (BX), and a thickener (C) (Li soap) (added to adjust the consistency to approximately 300) were mixed and agitated as a whole. Thereafter, the mixture was adjusted to Grade No. 1 to Grade No. 2 consistency using three roll mills, and thus a grease composition of each of the Examples 1 to 4 and Comparative Examples 1 and 2 was prepared. Note that the details of each component are as follows.

Methyl phenyl silicone (A): available from Dow Corning Corporation, DC510-100 $mm^2/s$ (25° C.)

Zinc dialkyldithiocarbamate (B): zinc dimethyldithiocarbamate

Zinc dialkyldithiophosphate (BX): zinc bis(2-ethylhexyl) dithiophosphate

Thickener (C):

Li soap: lithium stearate

Overrunning Clutch Torque Transmission Test

A stipulated amount of the grease composition was enclosed in an overrunning clutch member of an automobile starter, and then a ring gear to which the starter motor was fixed was engaged under a stipulated condition (−30° C.). It was determined whether the clutch could transmit the torque generated by the motor of the starter without slipping to the fixed ring gear side. A reduction starter was used for the test. With a fixed interval, the number of times at which electricity was turned on was recorded. Occurrence of slipping was evaluated by setting 3000 time as a reference.

Overrunning Clutch Wear Test

A stipulated amount of the grease composition was enclosed in an overrunning clutch member of an automobile starter. Under a stipulated condition, while the starter motor was rotated without any load, the ring gear engaged with the starter motor was idled in the inner part of the overrunning clutch of the starter by performing high-speed rotation at the rate that is not lower than five times the number of rotation of the starter motor without any load. After completion of a stipulated number of operation, diameter after the wear (=wear diameter, μm) of the roller was determined and used as an wear loss. For the test, a planetary starter was used.

Evaluation of Effect (1) Overrunning clutch torque transmission test

Passed: Slipping did not occur in 3000 times or greater.

Failed: Slipping occurred in less than 3000 times.

(2) Overrunning clutch wear test

Passed: Wear loss was less than 130 μm.

Failed: Wear loss was 130 μm or greater.

TABLE 1

|  | Example | | | | Comparative Example | |
|---|---|---|---|---|---|---|
|  | 1 | 2 | 3 | 4 | 1 | 2 |
| Base oil: Methyl phenyl silicone (A) (mass %) | 73.74 | 77.14 | 75.44 | 75.01 | 73.74 | 73.74 |
| Zinc dialkyldithiocarbamate (B) (mass %) | 13.25 | 9.25 | 11.25 | 11.75 | 11.25 | 9.25 |
| Zinc dialkyldithiophosphate (BX) (mass %) | 0 | 0 | 0 | 0 | 2.0 | 4.0 |
| Li soap (C) (mass %) | 13.01 | 13.61 | 13.31 | 13.24 | 13.01 | 13.01 |
| Overruning clutch torque transmission test | Passed >3000 | Passed >3000 | Passed >3000 | Passed >3000 | Failed <3000 | Failed 1700-2400 |
| Overrunning clutch abrasion test | Passed 60-100 | Passed 90-130 | Passed 80-130 | Passed 70-110 | Passed 60-120 | Failed 110-200 |

As described above, only the case where the zinc dialkyldithiocarbamate was used alone as the extreme-pressure additive reduced slipping, efficiently transmitted torque, and achieved high friction characteristics and wear characteristics. On the other hand, when the zinc dialkyldithiophosphate was used together, friction characteristics or wear characteristics were deteriorated.

The invention claimed is:

1. A method for transmitting torque of a clutch or a torque limiter mechanism, the method comprising:
    enclosing a grease composition in a lubricating part of the clutch or the torque limiter mechanism;
    wherein the enclosed grease composition consists of:
    (A) a silicone oil having the general formula (I): $R^1_a SiO_{(4-a)/2}$ in which each $R^1$ is independently selected from the group consisting of monovalent hydrocarbon groups, and a is from 1.8 to 2.2;
    (B) zinc dialkyldithiocarbamate having the general formula (II): $[R^5_2N\text{---}C(\text{=-}S)\text{---}S]_2\text{---}Zn$ in which each $R^5$ is a methyl group; and
    (C) an organic thickener selected from the group consisting of lithium soap and lithium complex soap;
    wherein a content of the silicone oil (A) is from 60 mass % to 90 mass %, a content of the zinc dialkyldithiocarbamate (B) is from 7.5 mass % to 20 mass %, and a content of the organic thickener (C) is from 2.5 mass % to 20 mass %, each relative to the total amount of the enclosed grease composition, provided the total of components (A), (B), and (C) is 100 mass % of the enclosed grease composition.

2. The method according to claim 1, wherein the silicone oil (A) has an aromatic hydrocarbon group per molecule.

3. The method according to claim 1, wherein the clutch is an overrunning clutch and wherein the enclosed grease composition is enclosed in a clutch cam chamber formed by an outer clutch and an inner clutch.

4. The method according to claim 1, wherein the organic thickener (C) is lithium stearate.

5. The method according to claim 4, wherein the silicone oil (A) is of the general formula

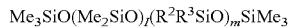

where Me is a methyl group, $R^2$ is a methyl group or a phenyl group, $R^3$ is a phenyl group, I is 0 or a positive integer, and m is a positive integer.

6. The method according to claim 1, wherein the silicone oil (A) is of the general formula

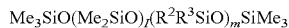

where Me is a methyl group, $R^2$ is a methyl group or a phenyl group, $R^3$ is a phenyl group, I is 0 or a positive integer, and m is a positive integer.

7. The method according to claim 1, wherein the organic thickener (C) is a lithium soap.

8. The method according to claim 1, wherein:
    (i) the content of the silicone oil (A) is from 73.74 mass % to 77.14 mass %;
    (ii) the content of the zinc dialkyldithiocarbamate (B) is from 9.25 mass % to 13.25 mass %;
    (iii) the content of the organic thickener (C) is from 13.01 mass % to 13.61 mass %; or
    (iv) each one of (i) to (iii); and
    wherein each mass % is relative to 100 mass % of the enclosed grease composition.

9. The method according to claim 1, further comprising:
    providing the grease composition prior to the enclosing step, wherein the grease composition consists of components (A), (B), and (C).

10. The method according to claim 1, further comprising:
    providing an automobile starter, the automobile starter having the clutch or torque limiter mechanism.

11. The method according to claim 10, wherein the clutch is an overrunning clutch and wherein the enclosed grease composition is enclosed in a clutch cam chamber formed by an outer clutch and an inner clutch.

12. The method according to claim 10, further comprising:
    powering the automobile starter, thereby transmitting torque of the clutch or torque limiter mechanism via the enclosed grease composition.

13. A method for transmitting torque of a clutch or a torque limiter mechanism, the method comprising:
    providing an automobile starter, the automobile starter having the clutch or torque limiter mechanism;
    providing a grease composition;
    enclosing the grease composition in a lubricating part of the clutch or the torque limiter mechanism of the automobile starter; and
    powering the automobile starter, thereby transmitting torque of the clutch or torque limiter mechanism via the enclosed grease composition;
    wherein the enclosed grease composition consists of:
    (A) a silicone oil having the general formula (I): $R^1_a SiO_{(4-a)/2}$ in which each $R^1$ is independently selected from the group consisting of monovalent hydrocarbon groups, and a is from 1.8 to 2.2;
    (B) zinc dialkyldithiocarbamate having the general formula (II): $[R^5_2N\text{---}C(\text{=-}S)\text{---}S]_2\text{---}Zn$ in which each $R^5$ is a methyl group; and (C) an organic thickener selected from the group consisting of lithium soap and lithium complex soap;

wherein a content of the silicone oil (A) is from 60 mass % to 90 mass %, a content of the zinc dialkyldithiocarbamate (B) is from 7.5 mass % to 20 mass %, and a content of the organic thickener (C) is from 2.5 mass % to 20 mass %, each relative to the total amount of the enclosed grease composition, provided the total of components (A), (B), and (C) is 100 mass % of the enclosed grease composition.

14. The method according to claim 13, wherein the clutch is an overrunning clutch and wherein the enclosed grease composition is enclosed in a clutch cam chamber formed by an outer clutch and an inner clutch.

15. The method according to claim 13, wherein the organic thickener (C) is lithium stearate.

16. The method according to claim 15, wherein the silicone oil (A) is of the general formula $$Me_3SiO(Me_2SiO)_l(R^2R^3SiO)_mSiMe_3$$

where Me is a methyl group, $R^2$ is a methyl group or a phenyl group, $R^3$ is a phenyl group, I is 0 or a positive integer, and m is a positive integer.

17. The method according to claim 13, wherein:
(i) the content of the silicone oil (A) is from 73.74 mass % to 77.14 mass %;
(ii) the content of the zinc dialkyldithiocarbamate (B) is from 9.25 mass % to 13.25 mass %; and
(iii) the content of the organic thickener (C) is from 13.01 mass % to 13.61 mass %;
wherein each mass % is relative to 100 mass % of the enclosed grease composition.

18. The method according to claim 13, consisting of the providing, enclosing, and powering steps.

* * * * *